United States Patent
Claus et al.

(10) Patent No.: US 7,805,358 B2
(45) Date of Patent: Sep. 28, 2010

(54) SYSTEM AND METHOD FOR LIMITING AGGRESSIVE TRADING IN A ELECTRONIC TRADING SYSTEM

(75) Inventors: Matthew W. Claus, Summit, NY (US); Kevin M. Foley, New York, NY (US); Nigel J. Renton, London (GB)

(73) Assignee: BGC Partners, Inc., New York, NY (US)

( * ) Notice: Subject to any disclaimer, the term of this patent is extended or adjusted under 35 U.S.C. 154(b) by 497 days.

(21) Appl. No.: 11/495,254

(22) Filed: Jul. 27, 2006

(65) Prior Publication Data
US 2007/0027797 A1 Feb. 1, 2007

Related U.S. Application Data

(60) Provisional application No. 60/703,623, filed on Jul. 29, 2005.

(51) Int. Cl.
*G06Q 40/00* (2006.01)
(52) U.S. Cl. .......................................... 705/37; 705/35
(58) Field of Classification Search ................ 75/35–45
See application file for complete search history.

(56) References Cited

U.S. PATENT DOCUMENTS

| | | | | |
|---|---|---|---|---|
| 5,136,501 | A | 8/1992 | Silverman et al. | 364/408 |
| 5,842,178 | A | 11/1998 | Giovannoli | 705/26 |
| 5,924,083 | A | 7/1999 | Silverman et al. | 705/37 |
| 6,317,727 | B1 | 11/2001 | May | 705/37 |
| 6,421,653 | B1 | 7/2002 | May | 705/37 |

(Continued)

FOREIGN PATENT DOCUMENTS

JP 2001-249962 9/2001

(Continued)

OTHER PUBLICATIONS

Liu, Chen-Ching, *Decision Support Tools for Trading in Deregulated Energy Systems*, Advanced Power Technologies (APT) Center, University of Washington, IEEE, pp. 409-410, 2001.

(Continued)

*Primary Examiner*—Rajesh Khattar
(74) *Attorney, Agent, or Firm*—Thomas D. Bradshaw

(57) ABSTRACT

A system for managing trading orders comprises a memory operable to store a trade credit associated with a trader. The system further comprises a processor operable to receive a trading order from the trader and determine the trade credit associated with the trader. If the received trading order is a passive trading order, the processor is further operable to increase the trade credit and submit the received trading order for execution. If the received trading order is an aggressive trading order, the processor is further operable to calculate a decrease of the trade credit. If subtracting the calculated decrease from the trade credit would not cause the trade credit to be less than a configurable threshold, the processor is further operable to submit the received trading order for execution and subtract the calculated decrease from the trade credit. If subtracting the calculated decrease from the trade credit would cause the trade credit to be less than the configurable threshold, the processor is further operable to prevent the execution of the received trading order.

47 Claims, 3 Drawing Sheets

U.S. PATENT DOCUMENTS

| | | | |
|---|---|---|---|
| 6,505,174 B1 | 1/2003 | Keiser et al. | 705/37 |
| 6,985,883 B1 | 1/2006 | Togher et al. | 705/37 |
| 7,003,488 B2 | 2/2006 | Dunne et al. | 705/37 |
| 7,006,991 B2 | 2/2006 | Keiser et al. | |
| 7,024,386 B1 | 4/2006 | Mills et al. | |
| 7,110,972 B1 | 9/2006 | Handa et al. | 705/37 |
| 7,222,089 B2 | 5/2007 | Harpale | 705/26 |
| 7,246,092 B1 | 7/2007 | Peterson et al. | 705/37 |
| 7,249,080 B1 | 7/2007 | Hoffman et al. | |
| 7,366,690 B1 | 4/2008 | Howorka et al. | |
| 7,386,497 B1 | 6/2008 | Gooch | 705/37 |
| 7,398,244 B1 | 7/2008 | Keith | |
| 2001/0042040 A1 | 11/2001 | Keith | 705/37 |
| 2002/0004776 A1 | 1/2002 | Gladstone | 705/37 |
| 2002/0010672 A1 | 1/2002 | Waelbroeck et al. | 705/37 |
| 2002/0032635 A1 | 3/2002 | Harris et al. | 705/37 |
| 2002/0099641 A1 | 7/2002 | Mills et al. | 705/37 |
| 2002/0156716 A1 | 10/2002 | Adatia | 705/37 |
| 2002/0161624 A1 | 10/2002 | Bradlee | 705/10 |
| 2003/0028461 A1 | 2/2003 | Kohorn | 705/36 |
| 2003/0028496 A1 | 2/2003 | Yearworth et al. | 705/80 |
| 2003/0033240 A1 | 2/2003 | Balson et al. | 705/37 |
| 2003/0154100 A1 | 8/2003 | Sato et al. | 705/1 |
| 2003/0200167 A1 | 10/2003 | Kemp, II et al. | 705/37 |
| 2003/0220867 A1 | 11/2003 | Goodwin et al. | 705/37 |
| 2004/0034591 A1 | 2/2004 | Waelbroeck et al. | 705/37 |
| 2004/0059666 A1 | 3/2004 | Waelbroeck et al. | 705/37 |
| 2004/0073506 A1 | 4/2004 | Tull, Jr. et al. | 705/36 |
| 2004/0122761 A1 | 6/2004 | Thierer et al. | 705/37 |
| 2004/0138904 A1 | 7/2004 | La Loggia | 705/1 |
| 2004/0153392 A1 | 8/2004 | West et al. | 705/37 |
| 2004/0210511 A1 | 10/2004 | Waelbroeck et al. | 705/37 |
| 2004/0236669 A1 | 11/2004 | Horst et al. | 705/37 |
| 2004/0254877 A1 | 12/2004 | Buckwalter et al. | 705/37 |
| 2004/0260640 A1 | 12/2004 | Crosthwaite et al. | 705/37 |
| 2005/0096931 A1 | 5/2005 | Baker et al. | 705/1 |
| 2005/0102220 A1 | 5/2005 | Stackpole | 705/37 |
| 2005/0108143 A1 | 5/2005 | Beadle et al. | 705/37 |
| 2005/0144109 A1 | 6/2005 | Boni et al. | 705/36 |
| 2005/0228739 A1 | 10/2005 | Leibowitz | 705/37 |
| 2006/0041498 A1 | 2/2006 | Hausman et al. | 705/37 |
| 2006/0080216 A1 | 4/2006 | Hausman et al. | 705/37 |
| 2006/0095327 A1 | 5/2006 | Vaughn et al. | |
| 2006/0112002 A1 | 5/2006 | Holland et al. | 705/37 |
| 2006/0190386 A1 | 8/2006 | Levy | 705/37 |
| 2006/0247997 A1 | 11/2006 | West et al. | 705/37 |
| 2007/0005487 A1 | 1/2007 | Keith | 705/37 |
| 2007/0233595 A1 | 10/2007 | Nordlicht et al. | 705/37 |

FOREIGN PATENT DOCUMENTS

WO     WO 01/50776 A2     7/2001

OTHER PUBLICATIONS

Moldovan, et al., *Trading in the Market: An Experiment in Group Decision Dynamics*, IEEE, 6 pages, 2003.

Schoreels, et al., *Agent Based Genetic Algorithm Employing Financial Technical Analysis for Making Trading Decisions Using Historical Equity Market Data*, IEEE, pp. 421-424, 2004.

*Journal of Beijing University of Technology*, The British Library—"The World's Knowledge", vol. 30, No. 2, 5 pages, Jun. 2004.

Patent Pending Application entitled *System and Method for Routing Trading Orders in an Electronic Trading System Using Trader Lists*, by Matthew W. Claus, et al., 48 total pages, Filed Jul. 27, 2006.

Patent Pending Application entitled *System and Method for Using Trader Lists in an Electronic Trading System to Route a Trading Order with a Reserved Size*, by Matthew W. Claus, et al, 44 total pages, Filed Jul. 27, 2006.

*Notification of Transmittal of the International Search Report and the Written Opinion of the International Searching Authority* for International Application No. PCT/US06/29472; 7 pages, Jul. 31, 2007.

*Notification of Transmittal of the International Search Report and the Written Opinion of the International Searching Authority* for International Application No. PCT/US06/29679; 9 pages, Aug. 20, 2007.

*United States Patent and Trademark Office; Office Action* for U.S. Appl. No. 11/495,235, filed Jul. 27, 2006 in the name of Matthew W. Claus; 13 pages, Sep. 3, 2008.

*Merriam-Webster Online Dictionary; Definition for "Associate"*; 2 pages.

*United States Patent and Trademark Office; Office Action* for U.S. Appl. No. 11/495,236, filed Jul. 27, 2006 in the name of Matthew W. Claus; 27 pages, Oct. 2, 2008.

U.S. PTO Office Action for U.S. Appl. No. 11/495,235; 13 pages, May 12, 2009.

U.S. PTO Office Action for U.S. Appl. No. 11/495,236; 40 pages; Jun. 18, 2009.

FIG. 2A

| RULES |
|---|
| 36a — INITIAL TRADE CREDIT EQUALS 5,000,000 UNITS |
| 36b — FOR PASSIVE TRADING ORDERS, INCREASE OF TRADE CREDIT EQUALS 25% OF TRADE VALUE |
| 36c — FOR AGGRESSIVE TRADING ORDERS, DECREASE OF TRADE CREDIT EQUALS 50% OF TRADE VALUE |
| 36d — IF RECEIVED TRADING ORDER WOULD CAUSE TRADE CREDIT TO BE LESS THAN 0 UNITS, THEN TRADING ORDER IS NOT SUBMITTED FOR EXECUTION |

TRADER: NAME
CONFIGURABLE THRESHOLD: 0 — 37

| ACTION | TRADE CREDIT |
|---|---|
| SESSION BEGINS | 5,000,000 |
| RECEIVE PASSIVE TRADING ORDER A ($10,000,000) SUBMIT TRADING ORDER A FOR EXECUTION | INCREASED TO 7,500,000 |
| RECEIVE AGGRESSIVE TRADING ORDER B ($10,000,000) SUBMIT TRADING ORDER B FOR EXECUTION | DECREASED TO 2,500,000 |
| RECEIVE AGGRESSIVE TRADING ORDER C ($20,000,000) PREVENT EXECUTION OF TRADING ORDER C | 2,500,000 (INSUFFICIENT TRADE CREDIT TO EXECUTE AGGRESSIVE TRADING ORDER C) |
| RECEIVE PASSIVE TRADING ORDER D ($20,000,000) SUBMIT TRADING ORDER D FOR EXECUTION | INCREASED TO 7,500,000 |

38, 35

SYSTEM AND METHOD FOR LIMITING AGGRESSIVE TRADING IN A ELECTRONIC TRADING SYSTEM

RELATED APPLICATION

This patent application claims priority from Patent Application Ser. No. 60/703,623, filed Jul. 29, 2005 entitled: System and Method for Limiting Aggressive Trading in an Electronic Trading System.

TECHNICAL FIELD OF THE INVENTION

The present invention relates generally to electronic trading and, more specifically, to a system for limiting aggressive trading orders.

BACKGROUND OF THE INVENTION

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

In one embodiment, a system for managing trading orders comprises a memory operable to store a trade credit associated with a trader. The system further comprises a processor operable to receive a trading order from the trader and determine the trade credit associated with the trader. If the received trading order is a passive trading order, the processor is further operable to increase the trade credit and submit the received trading order for execution. If the received trading order is an aggressive trading order, the processor is further operable to calculate a decrease of the trade credit. If subtracting the calculated decrease from the trade credit would not cause the trade credit to be less than a configurable threshold, the processor is further operable to submit the received trading order for execution and subtract the calculated decrease from the trade credit. If subtracting the calculated decrease from the trade credit would cause the trade credit to be less than the configurable threshold, the processor is further operable to prevent the execution of the received trading order.

In another embodiment, a method for managing trading orders comprises receiving a trading order from a trader. The method continues by determining a trade credit associated with the trader. If the received trading order is a passive trading order, the method continues by increasing the trade credit and submitting the received trading order for execution. If the received trading order is an aggressive trading order, the method continues by calculating a decrease of the trade credit. If subtracting the calculated decrease from the trade credit would not cause the trade credit to be less than a configurable threshold, the method continues by submitting the received trading order for execution and subtracting the calculated decrease from the trade credit. If subtracting the calculated decrease from the trade credit would cause the trade credit to be less than the configurable threshold, the method continues by preventing the execution of the received trading order.

Various embodiments of the present invention may benefit from numerous advantages. It should be noted that one or more embodiments may benefit from some, none, or all of the advantages discussed below.

One advantage is that the trading platform of the present invention uses trade credits to limit aggressive trading orders. Upon receiving a passive trading order from a particular trader, the trading platform increases the trade credit associated with that trader. Upon receiving an aggressive trading order from a particular trader, however, the trading system calculates a decrease of the trade credit associated with that trader. If subtracting the calculated decrease from the trade credit would cause the trade credit to be less than a configurable threshold, the trading platform may delete or otherwise reject the aggressive trading order rather than submit it to one or more market centers for execution. By decreasing the trade credit in response to aggressive trading orders and increasing the trade credit in response to passive trading orders, the trading platform encourages traders to submit passive trading orders. The trading platform may thereby increase liquidity in the trading system.

Another advantage is that the trading platform may increase or decrease the trade credit in proportion to the trade value associated with a trading order. Thus, the submission of a large, passive trading order with a high trade value may result in a greater increase of the trade credit than the submission of a small, passive trading order with a low trade value. Thus, the trading platform may encourage traders to submit larger passive trading orders. The trading platform may thereby increase liquidity in the trading system.

Another advantage is that the trading platform may cause the trade credit to decay over time. For example, if a particular trader does not submit any trading orders for a configurable period of time, the trading platform may cause the trade credit associated with that trader to decay or decrease at a configurable rate. By causing the trade credit to decay in response to the inactivity of the associated trader, the trading platform encourages traders to submit trading orders more frequently. The frequent submission of trading orders may increase the liquidity in the trading system.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIGS. 2A and 2B illustrate examples of trading rules and a trader profile, respectively, according to certain embodiments of the present invention.

DETAILED DESCRIPTION OF THE INVENTION

Figure 1:
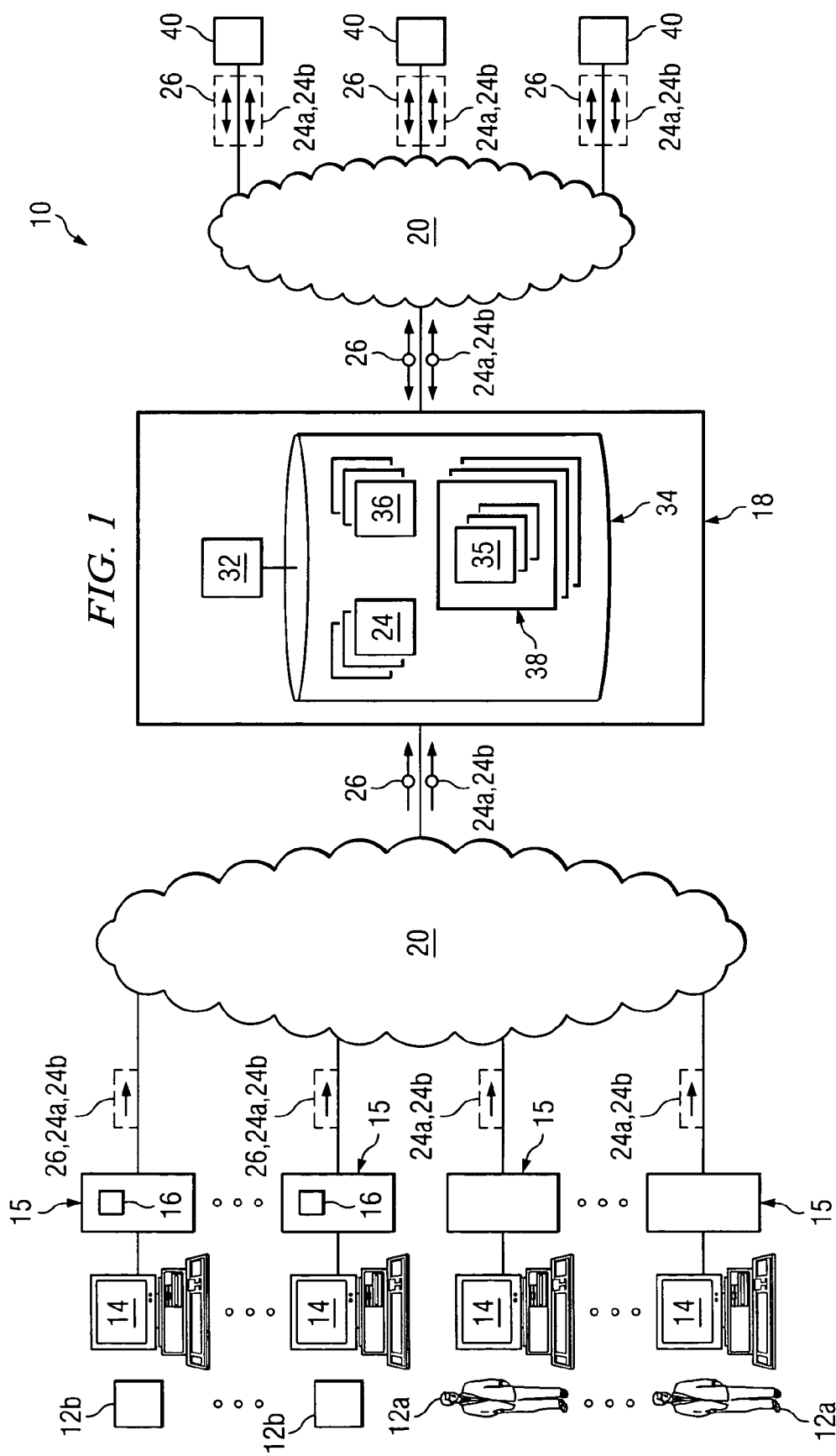
FIG. 1 illustrates one embodiment of a trading system in accordance with the present invention.

FIG. 1 illustrates a trading system 10 according to certain embodiments of the present invention. System 10 may include one or more terminals 14 coupled to a trading platform 18 by one or more communications networks 20. Generally, trading system 10 is operable to receive, route, and execute trading orders 24 from traders 12. More specifically, trading system 10 is operable to determine and adjust a trade credit 35 associated with a particular trader 12 in response to receiving trading order 24 from that trader 12. The adjustment of trade credit 35 may depend on whether the received trading order 24 is a passive trading order 24a or an aggressive trading order 24b. (Passive and aggressive trading orders 24 are described in detail below.) In particular, trading platform 18 may increase trade credit 35 if the received trading order 24 is a passive trading order 24a and decrease trade credit 35 if the received trading order 24 is an aggressive trading order 24b. If the received trading order 24 would cause trade credit 35 to be less than a configurable threshold 37, then platform 18 may prevent the execution of the received trading order 24. Trading platform 18 may thereby create incentives for traders 12 to submit more passive trading orders 24a and less aggressive trading orders 24b. By encouraging traders 12 to submit more passive trading orders 24a, trading platform 18 may increase liquidity in trading system 10.

Trading system 10 comprises one or more terminals 14. A particular terminal 14 represents any suitable local or remote end-user devices that may be used by traders 12 to access one or more elements of trading system 10, such as trading platform 18. Terminal 14 may comprise a computer, workstation, telephone, Internet browser, electronic notebook, Personal Digital Assistant (PDA), pager, or any other suitable device (wireline, wireless, or both), component, or element capable of receiving, processing, storing, and/or communicating information with other components of system 10. Terminal 14 may also comprise any suitable user interface such as a display, microphone, keyboard, or any other appropriate terminal equipment according to particular configurations and arrangements. It will be understood that there may be any number of terminals 14 communicatively connected to trading platform 18.

In some embodiments, terminal 14 may be communicatively coupled to interface server 15. Interface server 15 is generally operable to transmit trading orders 24, order price feeds 26, and market data between terminal 14 and trading platform 18. A particular interface server 15 that is coupled to terminal 14 for a particular trader 12 may store one or more trader profiles 38 and one or more trade credits 35 (described below). In some embodiments, interface servers 15 are operable to generate and update trader profiles 38 and to determine, adjust, and use trade credits 35 associated with traders 12. A particular interface server 15 may be communicatively coupled to any number and combination of terminals 14. Interface server 15 represents a general-purpose personal computer (PC), a Macintosh, a workstation, a Unix-based computer, a server computer, or any suitable processing device. Interface server 15 may include any hardware, software, firmware, or combination thereof operable to perform the functions and/or operations described above.

Terminals 14 are operable to receive trading orders 24 from traders 12 and to send trading orders 24 to trading platform 18. Trading orders 24 may comprise orders to trade products such as, for example, stocks, equity securities, bonds, mutual funds, options, futures, derivatives, currencies, other financial instruments, or any suitable trading product. Such trading orders 24 may comprise bids, offers, market orders, limit orders, stop loss orders, day orders, open orders, GTC ("good till cancelled") orders, "good through" orders, "all or none" orders, "any part" orders, or any other order suitable for trading.

The various types of trading orders 24 in trading system 10 may generally be characterized as either passive trading orders 24a or aggressive trading orders 24b. An aggressive trading order 24b is an order that activates or triggers a trade. In contrast, a passive trading order 24a is an order that does not, by itself, activate or trigger a trade. A "hit" and a "take" (e.g., "lift") are examples of aggressive trading orders 24b. A "bid" and an "offer" are generally examples of passive trading orders 24a. (In some situations, however, a bid or an offer may be considered an aggressive trading order 24b. For example, if trader 12 submits an offer that is below the best bid price, the offer may trigger or activate a trade and, therefore, be considered an aggressive trading order 24b.) An example illustrates passive and aggressive trading orders 24. A passive trader 12 may submit a "bid" to buy a particular amount of product A at a given price. In response to such a bid, an aggressive trader 12 may submit a "hit" to activate or trigger a sale of the particular amount of product A to the passive trader 12 at the given price. In this example, the bid is a passive trading order 24a and the hit is an aggressive trading order 24b. As another example, a passive trader 12 may submit an "offer" to indicate a willingness to sell a particular amount of product A at a given price. Subsequently, an aggressive trader 12 may submit a "lift" (or "take") in response to the offer to activate or trigger the purchase of the particular amount of product A at the given price from the passive trader 12. In this example, the offer is a passive trading order 24a and the lift (or take) is an aggressive trading order 24b.

Although terminals 14 are described herein as being used by "traders" 12, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 24 in system 10. Certain traders 12 may be customers 12a. Other traders 12 may be market makers 12b.

Market maker 12b is any individual, firm, or other entity that submits and/or maintains either or both bid and offer trading orders 24 simultaneously for the same instrument. For example, market maker 12b may be a brokerage or bank that maintains either a firm bid and/or offer price in a given security by standing ready, willing, and able to buy and/or sell that security at publicly quoted prices. Market maker 12b generally displays bid and/or offer prices for specific numbers of specific securities, and if these prices are met, market maker 12b will immediately buy for and/or sell from its own accounts. According to certain embodiments, a single trading order 24 may be filled by a number of market makers 12b at potentially different prices.

Customer 12a may be any user of trading system 10 that is not a market maker 12b. Customer 12a may be an individual investor, an agent acting on behalf of a principal, a principal, an individual, a legal entity (such as a corporation), or any machine or mechanism that is capable of placing and/or responding to trading orders 24 in system 10.

In some embodiments, market makers 12b may include individuals, firms or other entities that are granted particular privileges such that trading orders 24 received from such individuals, firms or other entities are treated as being received from a traditional market maker 12b (such as a brokerage or bank, for example). For example, certain individuals, firms or other entities that may otherwise be treated as customers 12a may be granted privileges to be treated as market makers 12b for the purposes of the systems and methods discussed herein. To receive market maker privileges, an individual, firm or other entity may be required to pay a fee, pay a commission, or submit and/or simultaneously maintain both bid and offer trading orders 24 for particular instruments. According to certain embodiments, an individual, firm or other entity may be designated as a market maker 12b for particular instruments but as a customer 12a for other instruments.

In some embodiments, a multi-tiered system of market makers 12b may be employed. Trading platform 30 may grant different privileges to different market makers 12b based on one or more criteria such as, for example, whether market maker 12b is associated with an electronic feed, whether market maker 12b is a strong trader, or whether market maker 12b has particular information. Market makers 12b may be categorized into different tiers for different tradable instruments. For instance, a particular market maker 12b may be categorized as a first-level market maker for instrument(s) for which that market maker 12b is a strong trader and as a second-level market maker 12b for other types of instrument.

Terminals 14 may be communicatively coupled with order price feed modules 16. An order price feed module 16 comprises any suitable hardware and/or software for generating and/or communicating one or more order price feeds 26. In some embodiments, order price feed module 16 may be separate from terminal 14 and interface server 15. In other embodiments, order price feed module 16 may be comprised within terminal 14 or interface server 15. Thus, the functions and operations of order price feed module 16 may, in some embodiments, be performed by terminal 14, interface server 15, or any other suitable component of trading system 10. An order price feed 26 may be a real time (or substantially real time) stream indicating the current best bid and/or offer that trader 12 is willing to send or make available for an instrument. For example, a particular market maker 12b may supply order price feed 26 (e.g., bid-offer spreads) to multiple trading exchanges 40 and/or trading platforms 18 to allow that market maker 12b to flood the general marketplace with its best bid and offer price. According to certain embodiments, market maker 12b generates revenue by persistently trading at its bid and offer prices and profiting the difference. Such a strategy may be referred to as "trading the bid-offer spread."

Terminals 14 may be communicatively coupled to trading platform 18 via network 20. Network 20 is a communication platform operable to exchange data or information between terminals 14 and trading platform 18 and/or market centers 40. In some embodiments, network 20 may represent an Internet architecture that enables terminals 14 to communicate with platform 18 and/or market centers 40. In other embodiments, network 20 may be a plain old telephone system (POTS), which traders 12 could use to perform the same operations or functions. In some embodiments, network 20 may be any packet data network (PDN) offering a communications interface or exchange between any two nodes in system 10. Network 20 may further comprise any combination of the above examples and any local area network (LAN), metropolitan area network (MAN), wide area network (WAN), wireless local area network (WLAN), virtual private network (VPN), intranet, or any other appropriate architecture or system that facilitates communications between terminals 14 and platform 18 and/or market centers 40.

Market centers 40 comprise all manner of order execution venues including exchanges, Electronic Communication Networks (ECNs), Alternative Trading Systems (ATSs), market makers, or any other suitable market participants. Each market center 40 maintains a bid and offer price in a given trading product by standing ready, willing, and able to buy or sell at publicly quoted prices, also referred to as market center prices. A particular market center 40 may facilitate trading of multiple trading products, such as, for example, stocks, fixed income securities, futures contracts, currencies, precious metals, and so forth. Market centers may be communicatively coupled to trading platform 18 via network 20.

Trading platform 18 is a trading architecture that facilitates the routing, matching, and otherwise processing of trading orders 24. Trading platform 18 may comprise a management center or a headquartering office for any person, business, or entity that seeks to route, match, process, or fill trading orders 24. Accordingly, trading platform 18 may include any suitable combination of hardware, software, personnel, devices, components, elements, or objects that may be utilized or implemented to achieve the operations and functions of an administrative body or a supervising entity that manages or administers a trading environment. Trading platform 18 may comprise a processor 32 and a memory 34.

Processor 32 is operable to record trading orders 12 in memory 34 and route trading orders 12 to trading exchanges 40. Processor 32 is further operable to execute rules 36 stored in memory 34 to process or route trading orders 24 received from traders 12. Processor 32 is operable to determine, adjust, and use trade credits 35 associated with traders 12. Processor 32 may comprise any suitable combination of hardware and software implemented in one or more modules to provide the described function or operation.

Memory 34 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates memory 34 as internal to trading platform 18, it should be understood that memory 34 may be internal or external to components of trading system 10, depending on particular implementations. Also, memory 34 illustrated in FIG. 1 may be separate or integral to other memory devices to achieve any suitable arrangement of memory devices for use in trading system 10.

According to certain embodiments, memory 34 comprises rules 36 and trader profiles 38. Generally, rules 36 comprises software instructions for routing, matching, processing, or filling trading orders 12. In particular, rules 36 may comprise instructions for determining, adjusting, and using trade credits 35 associated with traders 12.

Trader profiles 38 generally comprise information regarding the identity, trading preferences, trading history, and accounts of traders 12. Trading platform 18 may allow a person or entity to register to use trading system 10 as a trader 12. When a particular trader 12 registers to use trading system 10, trading platform 18 may generate trader profile 38 for that trader 12. Thus, for each trader 12 in trading system 10, memory 34 may store a corresponding trader profile 38. Trader profile 38 of a particular trader 12 may comprise relevant information such as, for example, the name, address, employer, and account information of that trader 12. Trading platform 18 may further store in trader profile 38 of a particular trader 12 trade credit 35 associated with that trader 12.

Trade credit 35 generally represents a real or artificial credit, value, or quantity that may facilitate the processing of trading orders 12. In particular, when trading platform 18 receives trading order 24 from trader 12, trading platform 18 may adjust trade credit 35 associated with trader 12 based on the type of the received trading order 24. Based on the amount of trade credit 35 associated with trader 12, trading platform 18 may further determine whether to accept the received trading order 24. Trade credit 35 may be expressed in terms of any real or artificial units. For example, trade credit 35 may be expressed as dollars (or any other suitable currency), as virtual dollars (or any other virtual currency), as shares, as notes, as credits, or as any number and combination of any suitable units.

It should be understood that the internal structure of trading platform 18 and the interfaces, processors, and memory devices associated therewith is malleable and can be readily changed, modified, rearranged, or reconfigured to achieve the intended operations of trading platform 18.

In operation, trading platform 18 manipulates trade credits 35 to create incentives for traders 12 to submit passive trading orders 24*a* and/or to limit aggressive trading orders 24*b*. According to certain embodiments, when trader 12 submits passive trading order 24*a*, trading platform 18 increases trade credit 35 associated with trader 12 and submits trading order 24*a* to one or more market centers 40 for execution. When trader 12 submits aggressive trading order 24*b*, however, trading platform 18 calculates a decrease of trade credit 35 associated with trader 12. If subtracting the calculated decrease from trade credit 35 would cause trade credit 35 to be less than configurable threshold 37, then trading platform 18 prevents the execution of aggressive trading order 24*b*. If subtracting the calculated decrease from trade credit 35 would not cause trade credit 35 to be less than configurable threshold 37, then trading platform 18 subtracts the calculated decrease from trade credit 35 and submits aggressive trading order 24*b* to one or more market centers 40 for execution. Thus, aggressive trading orders 24*b* may cause a decrease of trade credit 35, while passive trading orders 24*a* may cause an increase of trade credit 35. If trade credit 35 associated with trader 12 falls below configurable threshold 37, trading platform 18 may reject aggressive trading orders 24*b* from trader 12 until trader 12 submits one or more passive trading orders 24*a* to increase trade credit 35 sufficiently above configurable threshold 37.

According to certain embodiments, trading platform 18 may allow persons or entities to register to use trading system 10 as traders 12. When trader 12 registers to use trading system 10, trading platform 18 may generate trader profile 38 for trader 12 and may allocate trade credit 35 to trader 12. The amount of trade credit 35 allocated to trader 12 upon registration may be referred to as "initial trade credit." According to certain embodiments, trading platform 18 allocates to each new trader 12 the same or substantially equal amount of initial trade credit 35. In other embodiments, the initial trade credit 35 allocated to a particular trader 35 is based at least in part on one or more attributes of that trader 35. For example, the amount of the initial trade credit 35 may be based in part on the size, anticipated trading activity, trading history, affiliation, or any number and combination of characteristics of trader 12. Thus, in some embodiments, the initial trade credit 35 allocated to one trader 12 may differ from the initial trade credit 35 allocated to another trader. Trading platform 18 may store trade credit 35 associated with a particular trader 12 in trader profile 38 of that trader 12.

According to certain embodiments, trading platform 18 may be configured to monitor trading sessions of a particular trader 12. A trading session refers to a configurable period of time used by trading platform 18 to monitor and/or manage the trading activity of a particular trader 12. In some embodiments, trading system 10 may be configured such that a new trading session begins each hour, each day, each week, or any other suitable time period. In other embodiments, trading system 10 may be configured to define a trading session for a particular trader 12 as the time period beginning when that trader 12 logs into trading system 10 and ending when that trader 12 logs out of trading system 10. Trading platform 18 may be configured such that trading sessions are defined the same or differently for each trader 12. In some embodiments, at the end and/or beginning of a trading session of a particular trader 12, trading platform 18 may reset trade credit 35 associated with that trader 12 to be equal to the initial trade credit 35 allocated to that trader 12 upon registration.

In some embodiments, trading order 24 may be associated with a trade value. The trade value represents the size, worth, and/or value of a particular trading order. For example, a bid for 1,000,000 shares of a particular stock at $50.00 per share may be considered to have a trade value of $50,000,000. As another example, a hit for $10,000,000 face-value 10-year notes may be considered to have a trade value of $10,000,000. Although the trade values in the foregoing examples are expressed as dollars, it should be understood that the trade value of a trading order 24 may be expressed in terms of any suitable units.

As explained above, in some embodiments aggressive trading orders 24*b* cause a decrease of trade credit 35, while passive trading orders 24*a* cause an increase of trade credit 35. In response to receiving passive trading order 24*a*, trading platform 18 may determine the increase of trade credit 35 based at least in part on one or more characteristics of passive trading order 24*a*. Such characteristics may include, for example, the trade value, the type of trading product, or the quantity of trading product associated with passive trading order 24*a*. In some embodiments, the increase of trade credit 35 may be a configurable percentage of the trade value of passive trading order 24*a*. For example, memory 34 may comprise a particular rule 36 to increase trade credit 35 by 30% of the trade value of passive trading order 24*a*. In this example, if trade credit 35 is $100,000 and if passive trading order 24*a* has a trade value of $200,000, then trading platform 18 may increase trade credit 35 to be $160,000. Although trade credit 35 in the foregoing example is increased by 30% of the trade value of passive trading order 24*a*, it should be understood that the increase may be based on any percentage of the trade value or on any number and combination of characteristics of passive trading order 24*a*. In addition, although trade credit 35 in the foregoing example is expressed in terms of dollars, it should be understood that trade credit 35 may be expressed in terms of any real or artificial units.

Trading platform 18 is similarly operable to determine the decrease of trade credit 35 associated with a particular trader 12 in response to receiving an aggressive trading order 24*b* from that trader 12, according to certain embodiments. Trading platform 18 may determine the decrease of trade credit 35 based on one or more characteristics of aggressive trading order 24*b*. Such characteristics may include, for example, the trade value, the type of trading product, or the quantity of trading product associated with aggressive trading order 24*b*. In some embodiments, the increase of trade credit 35 may be a configurable percentage of the trade value of aggressive trading order 24b. The configurable percentage for decreasing trade credit 35 in response to receiving aggressive trading order 24b may be the same as or different than the configurable percentage for increasing trade credit 35 in response to receiving passive trading order 24a.

As explained above, trading platform 18 may prevent the execution of a particular aggressive trading order 24b if the decrease of trade credit 35 caused by aggressive trading order 24b would cause trade credit 35 to be less than configurable threshold 37. Configurable threshold 37 may be any suitable level or value for managing and/or limiting the execution of aggressive trading orders 24b. As an example, trading platform 18 may be configured such that configurable threshold 37 is zero. In this example, if aggressive trading order 24b submitted by trader 12 would cause trade credit 35 associated with trader 12 to fall below zero, then trading platform 18 may prevent the execution of aggressive trading order 24b. Although configurable threshold 37 in the foregoing example is zero, it should be understood that configurable threshold 37 may be set as any suitable value or level.

In some embodiments, configurable threshold 37 may be the same for each trader 12 in trading system 10. In other embodiments, configurable threshold 37 may be different for various traders 12 in trading system 10. Configurable threshold 37 associated with a particular trader 12 may be based at least in part on one or more attributes of that trader 12 such as, for example, the size, anticipated trading activity, trading history, affiliation, or any number and combination of characteristics of that trader 12. In some embodiments, configurable threshold 37 may be based on the time of a given trading session and/or on the volume of trading activity in trading system 10. For example, during times of low trading activity in trading system 10, trading platform 18 may increase or decrease configurable threshold 37 to be more or less favorable to trader 12. Similarly, during times of high trading activity, trading platform 18 may increase or decrease configurable threshold 37 to be more or less favorable to trader 12.

Trading platform 18 may prevent the execution of a particular aggressive trading order 24b if the decrease of trade credit 35 caused by aggressive trading order 24b would cause trade credit 35 to be less than configurable threshold 37. In some embodiments, preventing the execution of aggressive trading order 24b may comprise deleting aggressive trading order 24b, not submitting aggressive trading order 24b to market centers 40, withholding aggressive trading order 24b from execution, returning aggressive trading order 24b to trader 12 without submitting it for execution, and/or any other suitable step for preventing the execution of aggressive trading order 24b. In some embodiments, upon receiving from trader 12 a particular trading order 24 that would cause trade credit 35 to be less than configurable threshold 37, trading platform 18 may transmit a message that invites or requests trader 12 to modify the particular trading order 24 such that the particular trading order 24 would not cause trade credit 35 to be less than configurable threshold 37. For example, if the particular trading order 24 is an aggressive trading order 24b, trading platform 18 may recommend to trader 12 modifying the particular trading order 24 to be a passive trading order 24a and/or to have a higher or lower trade value. In some embodiments, trading platform 18 may be configured to—upon receiving from trader 12 a particular trading order 24 that would cause trade credit 35 to be less than configurable threshold 37—automatically modify the particular trading order 24 such that the modified trading order 24 would not cause trade credit 35 to be less than configurable threshold 37.

In the foregoing examples, trading platform 18 stores, determines, and adjusts trade credit 35 associated with a particular trader 12. It should be understood, however, that these functions and operations may, in some embodiments, be performed by interface server 15 or by interface server 15 in conjunction with trading platform 18. For example, interface server 15 may comprise all or a portion of an application program interface (API) associated with trading platform 18. In particular, interface server 15 may allocate an initial trade credit 35, determine trade credit 35, increase trade credit 35 in response to receiving passive trading order 24a, decrease trade credit 35 in response to receiving aggressive trading order 24b, and prevent the execution of a particular trading order 24 if that trading order 24 would cause trade credit 35 to fall below a configurable threshold 37. Thus, in some embodiments, the function of determining, adjusting, and using trade credit 35 may be performed by one or more interface servers 15.

According to certain embodiments, the use of trade credit 35 to manage the processing of trading orders 24 may offer various advantages. It should be noted that one or more embodiments may benefit from some, none, or all of the advantages discussed below. One advantage is that, by decreasing trade credit 35 in response to aggressive trading orders 24b and increasing trade credit 35 in response to passive trading orders 24a, trading platform 18 encourages traders 12 to submit passive trading orders 24a. By encouraging the submission of more passive trading orders 24a, trading platform 18 may increase liquidity in trading system 10. Another advantage is that trading platform 18 may increase or decrease trade credit 35 in proportion to the trade value associated with trading order 24. Thus, the submission of a large, passive trading order 24a with a high trade value may result in a greater increase of trade credit 35 than the submission of a small, passive trading order 24a with a low trade value. Thus, trading platform 18 may encourage traders 12 to submit larger passive trading orders 24a. Trading platform 18 may thereby increase liquidity in trading system 10.

FIGS. 2A and 2B provide an example of using trade credit 35 to manage the trading activity of a particular trader 12, according to certain embodiments of the present invention. In particular, FIG. 2A illustrates an example of rules 36 stored in memory 34. In this example, rules 36 comprise four rules—rules 36a-36d. Rule 36a is that, at the start of a trading session for a particular trader 12, trading platform 18 allocates (or resets) to that trader 12 an initial trade credit 35 of 5,000,000 units. Rule 36b is that, in response to receiving passive trading order 24a, trading platform 18 calculates an increase of trade credit 35 wherein the increase is equal to 25% of the trade value of passive trading order 24a. Rule 36c is that, in response to receiving aggressive trading order 24b, trading platform 18 calculates a decrease of trade credit 35 wherein the decrease is equal to 50% of the trade value of aggressive trading order 24b. Rule 36d is that, if subtracting the calculated decrease would cause trade credit 35 to be less than zero units, trading platform 18 deletes aggressive trading order 24b without submitting aggressive trading order 24b to market centers 40 for execution.

FIG. 2B illustrates an example of trader profile 38 according to certain embodiments of the present invention. In this example, trader profile 38 comprises records of trading activity of trader 12 in accordance with rules 36a-d illustrated in FIG. 2A. In this example, trader profile 38 shows that a trading session began for a particular trader 12. At the beginning of the trading session, based on rule 36a in memory 34, trading platform 18 allocated to trader 12 an initial trade credit 35 of 5,000,000 units. Subsequently, trading platform 18 received from trader 12 passive trading order A with a trade value of $10,000,000. Because trading order A was passive, trading platform increased trade credit 35 to 7,500,000 units (i.e., 5,000,000+(0.25×10,000,000)) and submitted passive trading order A to one or more market centers 40 for execution. Trading platform 18 then received from trader 12 aggressive trading order B with a trade value of $10,000,000. Because trading order B was aggressive, trading platform 18 calculated that the decrease of trade credit 35 would be 5,000,000 units (0.50×$10,000,000). Because subtracting 5,000,000 units from trade credit 35 would not cause trade credit 35 to be less than the particular configurable threshold 37 of zero, trading platform subtracted the calculated decrease from trade credit 35, yielding an adjusted trading credit 35 of 2,500,000 units. In addition, trading platform 18 submitted aggressive trading order B to one or more market centers 40 for execution.

In the present example, trading platform 18 next received from trader 12 aggressive trading order C with a trade value of $20,000,000. Because trading order B was aggressive, trading platform 18 calculated that the decrease of trade credit 35 would be 10,000,000 units (0.50×$20,000,000). Because subtracting 10,000,000 units from trade credit 35 would cause trade credit 35 to be less than configurable threshold 37 of zero, trading platform prevented the execution of aggressive trading order C. Trading platform subsequently received from trader 12 passive trading order D with a trade value of $20,000,000. Because trading order D was passive, trading platform 18 increased trade credit 35 to 7,500,000 units (i.e., 2,500,000+(0.25×20,000,000)) and submitted passive trading order D to one or more market centers 40 for execution. Thus, by decreasing trade credit 35 in response to aggressive trading orders 24b and increasing trade credit 35 in response to passive trading orders 24a, trading platform 18 in this example provided incentives for trader 12 to submit passive trading orders 24a.

Although the foregoing example illustrates allocating (or resetting) to trader 12 an initial trade credit 35 at the beginning of each trading session, it should be understood that trading platform 18 need not allocate (or reset) to trader 12 an initial trade credit 35 at the beginning of each trading session. In particular, according to certain embodiments, trading platform 18 may allocate an initial trade credit 35 to trader 12 upon registration without thereafter resetting trade credit 35 at the beginning of a particular trading session. Although the foregoing example illustrates a particular configurable threshold 37 of zero, it should be understood that configurable threshold 37 may be configured to be any suitable value or level.

Although the foregoing example illustrates rules 36 that increase or decrease trade credit 35 based on percentages of the trade value of trading order 24, it should by understood that the increase or decrease of trade credit 35 may be based on any suitable criteria such as, for example, the size of trading order 24, the type of trading product associated with trading order 24, or any number and combination of criteria. Although the foregoing example illustrates increasing or decreasing trade credit 35 based on particular percentages (i.e., 50% and 25%), it should be understood that trade credit 35 may be adjusted based on any configurable percentage of the trade value of trading order 24, according to certain embodiments. Alternatively, or in addition, the increase or decrease of trade credit 35 may be based on fixed values, tiers, time, and/or any other suitable algorithm.

According to certain embodiments, trading platform 18 may be configured to cause trade credit 35 associated with trader 12 to decay at a configurable rate over time. The decay of trade credit 35 may be triggered based on any suitable criteria. For example, the decay of trade credit 35 may be triggered by inactivity of trader 12 and/or by trade credit 35 exceeding a decay threshold. According to certain embodiments, if trader 12 is inactive for more than a configurable period of time, trading platform 18 may cause trade credit 35 associated with trader 12 to begin to decay. In other embodiments, if trade credit 35 is increased such that trade credit 35 exceeds a configurable decay threshold, trading platform 18 may cause trade credit 35 to decay until trade credit 35 is equal to or less than the configurable decay threshold. The decay threshold may be configured to be more than, equal to, or less than the initial trade credit 35 allocated to trader 12. The decaying of trade credit 35 may comprise the decreasing of trade credit 35 as a function of time. For example, trade credit 35 may be set to decay by 1,000 units every minute, by 100,000 units every hour, or at any suitable rate.

An example illustrates certain embodiments of the present invention. Referring to the example illustrated in FIG. 2B, trading platform 18 may comprise a particular rule 36 to cause trade credit 35 to decay at a rate of 10,000 units per minute if trading platform 18 does not receive from trader 12 at least one passive trading order 24a every hour. In this example, the session began at 10:00 a.m. and trading platform 18 received passive trading order A at 10:15 a.m. Subsequently, trading platform 18 received passive trading order D at 10:45 a.m. Passive trading order D caused trade credit 35 to increase to 7,500,000 units. Based on rule 36, if trading platform 18 does not receive another passive trading order by 11:45 a.m., trading platform 18 may cause trade credit 35 to begin to decay. In this example, trader 12 does not submit another passive trading order 24a until 11:55 a.m.—ten minutes after trade credit 35 began to decay at a rate of 10,000 units per minute. Thus, by 11:55 a.m., trade credit 35 has decayed to 7,400,000 units. In this example, trading platform 18 stops the decay of trade credit 35 upon receiving passive trading order 24a at 11:55 a.m. Trader 12 then has until 12:55 a.m. to submit another passive trading order 24a before the decay of trade credit 35 is triggered again. According to certain embodiments, by causing trade credit 35 to decay in response to the inactivity of trader 12, trading platform 18 may encourage traders 12 to submit passive trading orders 24a more frequently. The frequent submission of passive trading orders 24a may increase the liquidity in trading system 10.

The foregoing example describes triggering the decay of trade credit 35 based on inactivity of trader 12. It should be understood, however, that the decay of trade credit 35 may be triggered based on any suitable criteria such as, for example, trade credit 35 exceeding a configurable decay threshold. Although the foregoing example illustrates a decay rate of 10,000 units per minute, it should be understood that the decay rate may be configured to be any suitable rate.

According to certain embodiments, one or more traders 12 in trading system 10 may use an order price feed module 16 to submit an order price feed 26 to trading platform 18. As explained above, an order price feed 26 may be a real time (or substantially real time) stream indicating the current best bid and/or offer that trader 12 is willing to send or make available for an instrument. In some embodiments, trading system 10 may be configured such that one or more order price feeds 26 are designated as restricted. A particular order price feed 26 may be designated as restricted based on any suitable criteria. For example, order price feed 26 associated with trader 12 may be designated as restricted based on the size of trader 12, the account information of trader 12, the trading history of trader 12, and/or any other number and combination of suitable criteria. In some embodiments, trading platform 10 may use trade credits 35 to limit aggressive trading by traders 12 associated with order price feeds 26 that have been designated as restricted but not to limit aggressive trading by other traders 12.

Figure 3:
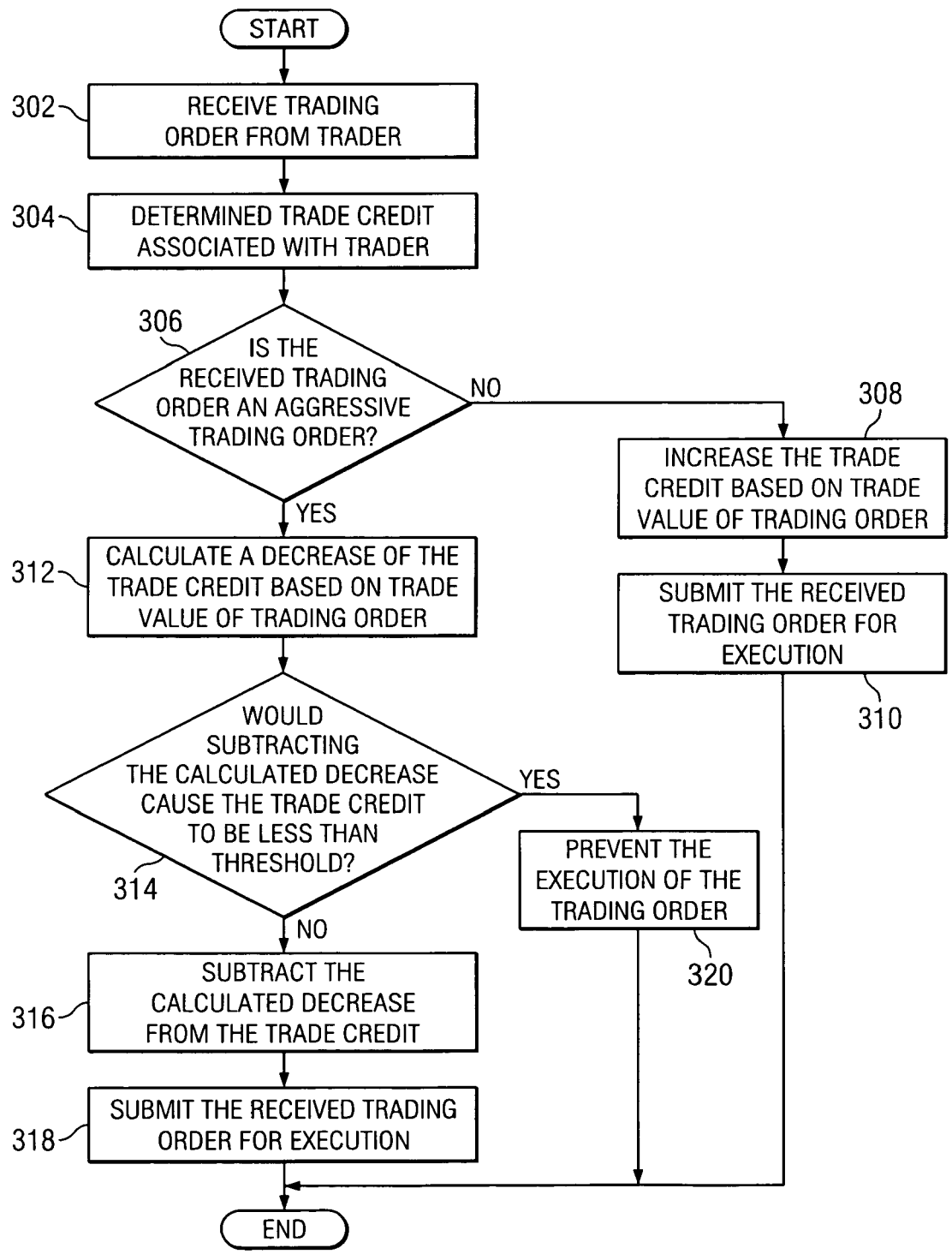
FIG. 3 illustrates a flowchart for using a trade credit to limit aggressive trading in an electronic trading system, according to certain embodiments of the present invention.

FIG. 3 illustrates a flowchart for limiting aggressive trading in trading system 10. The method begins at step 302 when trading platform 18 receives trading order 24 from trader 12. At step 304, trading platform 18 determines trade credit 35 associated with trader 12. Trader profile 38 of trader 12 may be stored in memory 34 and may comprise trade credit 35 associated with trader 12. At step 306, trading platform 18 determines whether the received trading order 24 is an aggressive trading order 24b. If trading platform 18 determines at step 306 that the received trading order is not an aggressive trading order 24b (e.g., that it is a passive trading order 24a), then at step 308 trading platform 18 increases trade credit 35 associated with trader 12. In some embodiments, trade credit 35 may be increased based at least in part on the trade value of the received trade order 24. At step 310, trading platform 18 submits the received trading order 24 to one or more market centers 40 for execution.

If, however, trading platform 18 determines at step 306 that the received trading order 24 is an aggressive trading order 24b, then at step 312 trading platform calculates a decrease of trade credit 35. The calculated decrease of trade credit 35 may be based at least in part on the trade value of the received trading order 24. At step 314, trading platform 18 determines whether subtracting the calculated decrease would cause trade credit 35 associated with trader 12 to be less than configurable threshold 37. If trading platform determines at step 314 that subtracting the calculated decrease from trade credit 35 would cause trade credit 35 to be less than configurable threshold 37, then at step 320 trading platform prevents the execution of the received trading order 24. In some embodiments, preventing the execution of the received trading order 24 may comprise deleting the received trading order 24, not submitting the received trading order 24 to market centers 40, withholding the received trading order 24 from execution, returning the received trading order 24 to trader 12 without submitting it for execution, and/or any other suitable step for preventing the execution of the received trading order 24.

If, however, trading platform determines at step 314 that subtracting the calculated decrease from trade credit 35 associated with trader 12 would not cause trade credit 35 to be less than configurable threshold 37, then at step 316 trading platform subtracts the calculated decrease from trade credit 35. The method then proceeds to step 310, where trading platform 18 submits the received trading order 24 to one or more market centers 40 for execution. The method then ends. In some embodiments, trading platform 18 may receive subsequent trading orders 24 from trader 12. Trading platform 18 may repeat the method illustrated in FIG. 3 for each of the subsequent trading orders 24.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A system for managing trading orders, comprising:
a processor; and
a memory that stores a trade credit associated with a trader in a trader account, and that stores instructions which, when executed by the processor, direct the processor to:
(a) receive a trading order from the trader, the trading order comprising an order to buy or sell a quantity of a financial instrument;
(b) determine the trade credit associated with the trader, in which the trade credit cannot be used by the trader to fund any purchase of a financial instrument;
(c) determine whether the trading order is (1) an aggressive trading order or (2) a passive trading order,
in which an aggressive trading order comprises an order that can be at least partially matched for execution with a preexisting order received by the processor prior to receiving the trading order, and
in which a passive trading order comprises an order that cannot be at least partially matched for execution with a preexisting order received by the processor prior to receiving the trading order;
(d) if the received trading order is a passive trading order that cannot be at least partially matched for execution with a preexisting order received by the processor prior to receiving the trading order, then:
increase the trade credit; and
submit the received trading order for execution; and
(e) if the received trading order is an aggressive trading order that can be at least partially matched for execution with a preexisting order received by the processor prior to receiving the trading order, then:
calculate a decrease of the trade credit; and
(1) based on a determination that subtracting the calculated decrease from the trade credit would not cause the trade credit to be less than a configurable threshold:
submit the received trading order for execution; and
subtract the calculated decrease from the trade credit; and
(2) based on a determination that subtracting the calculated decrease from the trade credit would cause the trade credit to be less than the configurable threshold, prevent the execution of the received trading order.

2. The system of claim 1, wherein the instructions, when executed by the processor, direct the processor to determine the trade credit by allocating to the trader an initial trade credit based on determining that the trader is a new trader.

3. The system of claim 2, wherein:
the trader is one of a plurality of traders; and
the initial trade credit allocated to the trader is substantially equal to an initial trade credit allocated to any one of the other plurality of traders.

4. The system of claim 1, wherein the received trading order is an initial trading order received from the trader during a configurable session, and the act of determining the trade credit comprises resetting the trade credit to be equal to an initial trade credit.

5. The system of claim 1, wherein the passive trading order is a bid or an offer.

6. The system of claim 1, wherein the aggressive trading order is a buy order or a sell order.

7. The system of claim 1, wherein:
the received trading order is associated with a trade value;
if the trade credit is increased, then the increase of the trade credit is based at least in part on the trade value; and
if the trade credit is decreased, then the decrease of the trade credit is based at least in part on the trade value.

8. The system of claim 7, wherein:
the increase of the trade credit is a configurable percentage of the trade value; and the decrease of the trade credit is a configurable percentage of the trade value.

9. The system of claim 1, wherein the processor is further operable to cause the trade credit to decay at a configurable rate over time.

10. The system of claim 1, wherein:
the configurable threshold is a first configurable threshold that is less than the initial trade credit allocated to the trader; and
the processor is further operable to, if the trade credit exceeds a second configurable threshold, cause the trade credit to decay at a configurable rate over time, wherein the second configurable threshold is greater than an initial trade credit allocated to the trader.

11. The system of claim 1, wherein the trader is associated with an order price feed that is designated as restricted.

12. The system of claim 1, wherein the configurable threshold is zero.

13. The system of claim 1, wherein preventing the execution of the received trading order comprises:
deleting the received trading order without submitting the received trading order for execution.

14. The system of claim 1, wherein the received trading order is a first trading order, and the processor is further operable to:
receive a plurality of other trading orders after receiving the first trading order; and
repeat steps (b)-(e) for each of the plurality of other trading orders.

15. A method for managing trading orders, comprising:
(a) receiving at a processor a trading order from a trader having a trading account that is used to fund purchase transactions by the trader and receive funds from sale transactions by the trader;
(b) determining by the processor a trade credit associated with the trader, in which the trade credit cannot be used by the trader to fund any purchase of a financial instrument, and in which the trade credit associated with the trader is increased whenever the processor receives a passive trading order from the trader and decreased whenever the processor receives an aggressive trading order from the trader,
in which an aggressive trading order comprises an order that can be at least partially matched for execution with a preexisting order received by the processor prior to receiving the trading order, and
in which a passive trading order comprises an order that cannot be at least partially matched for execution with a preexisting order received by the processor prior to receiving the trading order;
(d) determining that the trading order is an aggressive trading order that can be at least partially matched for execution with a preexisting order received by the processor prior to receiving the trading order;
(e) based on determining that the trading order is an aggressive trading order that can be at least partially matched for execution with a preexisting order received by the processor prior to receiving the trading order:
calculating by the processor a decrease of the trade credit;
determining that subtracting the calculated decrease from the trade credit would cause the trade credit to be less than a predetermined configurable threshold;
based on the act of determining that subtracting the calculated decrease from the trade credit would cause the trade credit to be less than the predetermined configurable threshold, causing the trading order to not be submitted for execution.

16. The method of claim 15, in which the trader is a new trader, and in which the act of determining a trade credit comprises allocating to the trader an initial trade credit.

17. The method of claim 16, wherein:
the trader is one of a plurality of traders; and
the initial trade credit allocated to the trader is substantially equal to an initial trade credit allocated to any one of the other plurality of traders.

18. The method of claim 15, wherein determining a trade credit comprises, if the received trading order is an initial trading order received from the trader during a configurable session, resetting the trade credit to be equal to an initial trade credit.

19. The method of claim 15, wherein the passive trading order is a bid or an offer.

20. The method of claim 15, wherein the aggressive trading order is a buy order or a sell order.

21. The method of claim 15, wherein:
the received trading order is associated in a database with a trade value;
if the trade credit is increased, then the increase of the trade credit is based at least in part on the trade value; and
if the trade credit is decreased, then the decrease of the trade credit is based at least in part on the trade value.

22. The method of claim 21, wherein:
the increase of the trade credit is a configurable percentage of the trade value; and
the decrease of the trade credit is a configurable percentage of the trade value.

23. The method of claim 15, further comprising causing the trade credit to decay at a configurable rate over time.

24. The method of claim 15, wherein:
the predetermined configurable threshold is a first predetermined configurable threshold that is less than the initial trade credit allocated to the trader; and
if the trade credit exceeds a second predetermined configurable threshold, causing the trade credit to decay at a configurable rate over time, wherein the second predetermined configurable threshold is greater than an initial trade credit allocated to the trader.

25. The method of claim 15, wherein the trader is associated with an order price feed that is designated as restricted.

26. The method of claim 15, wherein the predetermined configurable threshold is zero.

27. The method of claim 15, wherein preventing the execution of the received trading order comprises at least one of:
deleting the received trading order without submitting the received trading order for execution;
withholding the received trading order from execution; and
returning the received trading order to the trader without submitting the received trading order for execution.

28. The method of claim 15, wherein the received trading order is a first trading order, and further comprising:
receiving a plurality of other trading orders after receiving the first trading order; and
repeating steps (b)-(d) for each of the plurality of other trading orders.

29. The system of claim 1, in which the act of preventing the execution of the received trading order comprises transmitting to the trader an indication that the received trading order will not be executed.

30. The system of claim 1, in which the act of preventing the execution of the received trading order comprises causing the trading order to not be submitted to any market center.

31. The system of claim 1, in which the processor is further operable to:
   determine that the trade credit has exceeded a predetermined amount;
   based on determining that the trade credit has exceeded a predetermined amount, decreasing the trade credit as a function of time.

32. The system of claim 1, in which the trading order comprises a respective trade value, and in which the memory stores instructions which, when executed by the at least one processor, direct the at least one processor to:
   if the received trading order is a passive trading order, then increase the trade credit by an amount determined based at least in part on at least one of a size and a type of the trading order;
   if the received trading order is an aggressive trading order, then calculate a decrease of the trade credit based at least in part on at least one of a size and a type of the trading order.

33. The system of claim 1, in which the trading order comprises a respective trade value, and in which the memory stores instructions which, when executed by the at least one processor, direct the at least one processor to:
   if the received trading order is a passive trading order, then increase the trade credit by an amount that is substantially numerically proportional to the trade value; and
   if the received trading order is an aggressive trading order, then calculate a trade decrease amount by which the trade credit is decreased, the trade decrease amount being substantially equal to an amount that is numerically proportional to the trade value.

34. The method of claim 15, in which the act of determining that the trading order is an aggressive trading order comprises determining whether the trading order comprises an order that can be at least partially matched for execution with a current order that is received by the processor prior to the processor receiving the trading order.

35. An apparatus comprising:
   at least one processor; and
   a memory comprising a database that associates a plurality of trade credits with a respective plurality of traders, each trade credit associated in the database with a respective trader in a respective trader account, in which each trade credit cannot be used by the respective trader associated with the trader account to fund any purchase of a financial instrument, the plurality of traders comprising at least a first trader associated with a first trade credit in a first trader account, a second trader associated with a second trade credit in a second trader account, and a third trader associated with a third trade credit in a third trader account,
   in which the memory stores instructions which, when executed by the at least one processor, direct the at least one processor to:
     (a) receive a plurality of trading orders, each trading order being received from one of the plurality of traders, in which the act of receiving a plurality of trading orders comprises:
       receiving a first trading order from a first trader;
       receiving a second trading order from a second trader; and
       receiving a third trading order from a third trader;
     (b) determine that the first trading order is a passive trading order, in which the act of determining that the first trading order is a passive trading order comprises determining that the first trading order cannot be at least partially matched for execution with a current order that is received by the processor prior to the processor receiving the respective trading order;
     (c) responsive to a determination that the first trading order cannot be at least partially matched for execution with a current order that is received by the processor prior to the processor receiving the first trading order:
       increase the first trade credit; and
       transmit the first trading order to a trading system that executes the first trading order;
     (d) determine that the second trading order is an aggressive trading order, in which the act of determining that the second trading order is an aggressive trading order comprises determining that the second trading order can be at least partially matched for execution with a current order that is received by the processor prior to the processor receiving the second trading order;
     (e) responsive to determining that the second trading order can be at least partially matched for execution with a current order that is received by the processor prior to the processor receiving the second trading order:
       calculate a first decrease amount for the second trade credit;
       determine that decreasing the second trade credit by the first decrease amount would not cause the second trade credit to be less than a predetermined threshold;
       responsive to determining that decreasing the second trade credit by the first decrease amount would not cause the second trade credit to be less than a predetermined threshold, transmit the second trading order to a trading system that executes the second trading order;
       subtract the first decrease amount from the second trade credit; and
       store the decreased second trade credit in the database;
     (f) determine that the third trading order is an aggressive trading order, in which the act of determining that the third trading order is an aggressive trading order comprises determining that the third trading order can be at least partially matched for execution with a current order that is received by the processor prior to the processor receiving the third trading order; and
     (g) responsive to determining that the third trading order can be at least partially matched for execution with a current order that is received by the processor prior to the processor receiving the third trading order:
       calculate a second decrease amount for the third trade credit;
       determine that decreasing the third trade credit by the second decrease amount would cause the third trade credit to be less than a predetermined threshold; and
       responsive to determining that decreasing the third trade credit by the second decrease amount would cause the third trade credit to be less than a predetermined threshold, causing the third trading order to not be submitted for execution.

36. The apparatus of claim 35, in which each trading order comprises a respective trade value, and in which the memory stores instructions which, when executed by the at least one processor, direct the at least one processor to:
   responsive to a determination that the first trading order cannot be at least partially matched for execution with a current order that is received by the processor prior to the processor receiving the first trading order, increase the first trade credit by an amount determined based on the respective trade value of the first trading order;

responsive to determining that the second trading order can be at least partially matched for execution with a current order that is received by the processor prior to the processor receiving the second trading order, calculate a decrease of the second trade credit based on the respective trade value of the second trading order; and responsive to determining that the third trading order can be at least partially matched for execution with a current order that is received by the processor prior to the processor receiving the third trading order, calculate a decrease of the third trade credit based on the respective trade value of the third trading order.

37. The apparatus of claim 35, in which the second trading order comprises a hit of a pre-existing bid submitted by a fourth trader, in which the hit of the pre-existing bid triggers a trade so that the second trader sells a quantity of a financial instrument to the fourth trader, and in which the third trading order comprises a hit of a pre-existing bid submitted by a fifth trader, in which the hit of the pre-existing bid triggers a trade so that the third trader sells a quantity of a financial instrument to the fifth trader.

38. The method of claim 35, in which each of the plurality of trade credits comprises a non-monetary trade credit that cannot be used by any trader to fund any purchase of a financial instrument.

39. The system of claim 1, further comprising:
causing the trade credit to decay at a rate that is a function of time.

40. The system of claim 1, further comprising:
causing the trade credit to decrease over time by a fixed amount per a predetermined period of time unless at least one passive trading order is received from the particular trader in the predetermined period of time.

41. The system of claim 1, further comprising:
determining an initial trade credit for a particular trader based at least in part on at least one of a size of the particular trader, anticipated trading activity of the particular trader, trading history of the particular trader, and affiliation of the particular trader.

42. The system of claim 1, in which a passive trading order causes the trade credit to be increased by an amount based on a first percentage of the size of the passive trading order, and in which an aggressive trading order causes the trade credit to be decreased by a first percentage of the size of the aggressive trading order, and in which the first percentage is greater than the second percentage.

43. The system of claim 1, in which the trade credit comprises a non-monetary amount.

44. The system of claim 1, in which the determination that the received trading order is an aggressive trading order that can be at least partially matched for execution with a preexisting order received by the processor prior to receiving the trading order comprises determining that the trading order comprises a hit of a pre-existing bid by another trader, in which the hit of the pre-existing bid triggers a trade so that the trader sells a quantity of a financial instrument to the another trader.

45. The system of claim 1,
in which the act of increasing the trade credit comprises increasing the trade credit based on an amount determined based on a first percentage of a trade value associated with the passive trading order, and
in which the calculating a decrease of the trade credit comprises calculating a decrease of the trade credit based on an amount determined based on a second percentage of a trade value associated with the aggressive trading order, in which the first percentage is different from the second percentage.

46. The system of claim 1, wherein preventing the execution of the received trading order comprises:
withholding the received trading order from execution.

47. The system of claim 1, wherein preventing the execution of the received trading order comprises:
returning the received trading order to the trader without submitting the received trading order for execution.

\* \* \* \* \*